United States Patent [19]

Jamieson

[11] Patent Number: 4,524,875

[45] Date of Patent: Jun. 25, 1985

[54] DERRICK CRANE

[75] Inventor: John R. Jamieson, Largs, Scotland

[73] Assignee: Vickers p.l.c., London, England

[21] Appl. No.: 425,876

[22] Filed: Sep. 28, 1982

[30] Foreign Application Priority Data

Oct. 15, 1981 [GB] United Kingdom ............... 8131083

[51] Int. Cl.$^3$ ............................................. B66C 23/16
[52] U.S. Cl. ................... 212/239; 212/247; 212/253
[58] Field of Search ............ 212/223, 232, 253, 245, 212/247, 192, 239, 255, 262

[56] References Cited

U.S. PATENT DOCUMENTS

| 1,018,529 | 2/1912 | Swensson | 212/253 |
| 2,079,663 | 5/1937 | Rasmussen | 212/253 |
| 3,391,810 | 7/1968 | Tourneau | 212/247 |
| 3,811,577 | 5/1974 | Yancey | 212/247 |
| 3,957,161 | 5/1976 | Tax | 212/245 |
| 3,977,531 | 8/1976 | Brewer | 212/247 |
| 3,985,406 | 10/1976 | Baron | 212/253 |
| 4,061,230 | 12/1977 | Goss et al. | 212/253 |
| 4,184,600 | 1/1980 | Goss et al. | 212/253 |
| 4,216,870 | 8/1980 | Bonneson et al. | 212/223 |

FOREIGN PATENT DOCUMENTS 901948 12/1953 Fed. Rep. of Germany ...... 212/253

Primary Examiner—Galen L. Barefoot
Assistant Examiner—Stephen P. Avila
Attorney, Agent, or Firm—Larson and Taylor

[57] ABSTRACT

A derrick crane has a jib pivoted by way of a horizontal pivot to the movable member of a bearing device supported by a vertically extending mast and includes devices for raising and lowering a load, luffing the jib and slewing the jib about the mast. The bearing device comprises a single ring of free running balls which are a running fit in part circular registering grooves formed in inner and outer bearing rings. The bearing device is located on the mast in such a position that the line of thrust of the jib passes within the pitch circle diameter of the ring of balls.

8 Claims, 3 Drawing Figures

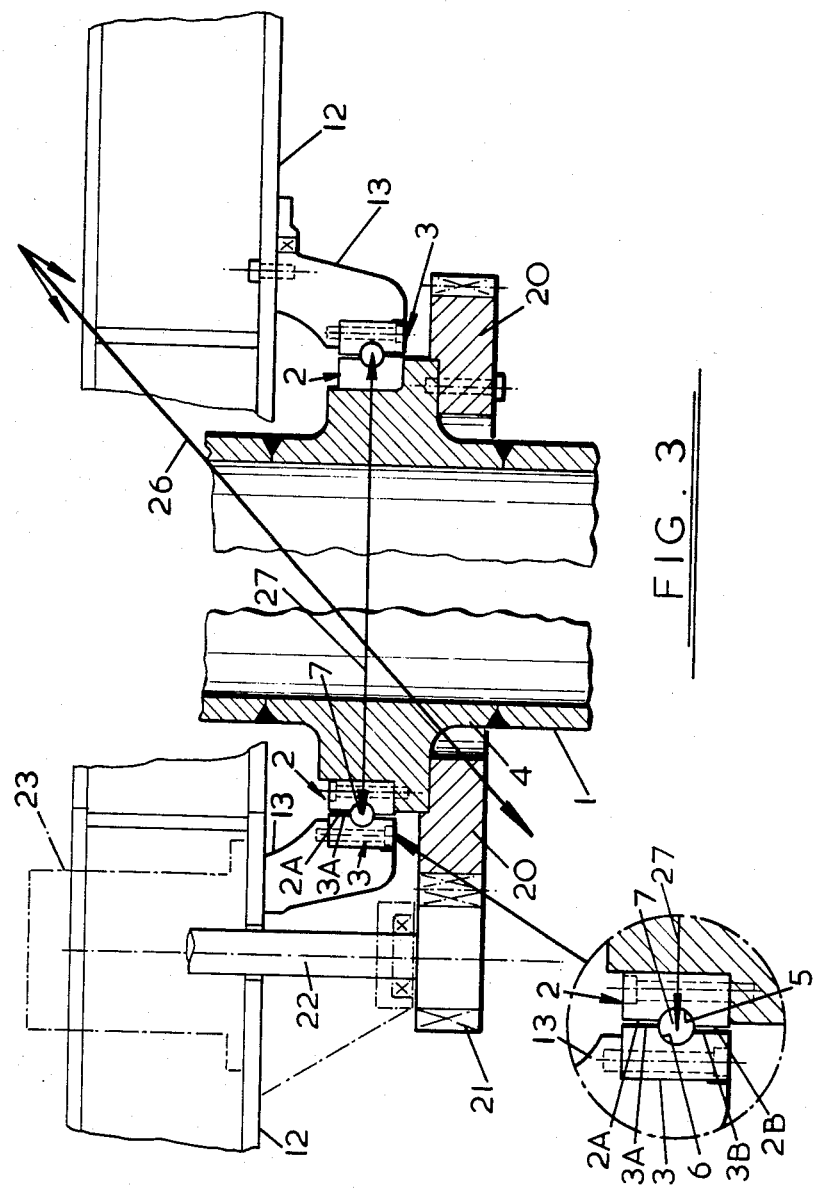

DERRICK CRANE

FIELD OF THE INVENTION

The subject of this invention is a derrick crane.

BACKGROUND OF THE INVENTION

Deck cranes of the derrick type are commonly employed on board ship and on oil rigs. Such deck cranes normally comprise a main structure mounted on a short fixed post which rotates on top of the post, the structure carrying pivoted thereto a jib and luffing and hoisting gear connected between the structure and the jib. The connection of the structure to the post comprises a thrust bearing usually consisting of outer and inner ring members, the inner ring member being fixed to the post and the outer ring member being connected to the structure and carrying gear teeth engaged by a driving pinion.

In such a known construction the thrust bearing has to carry almost all the static and live loads imposed by the jib. These are the very eccentric loads comprising the weight of the jib itself and the weight of any load supported by the jib, also the slewing forces, luffing forces and load acceleration and deceleration forces. The bearing ring is thus under continual forces tending to twist it on the post. In addition to such twisting load the structure presents a considerable area to the wind and a high wind blowing against the crane either augments the twisting force on the bearing ring or introduces a fresh twisting force in another direction further complicating the stress conditions. These troubles can be even further augmented if it should happen that the crane hook becomes snagged on a portion of the ship's structure or the structure of an oil rig while the crane is hoisting. This can happen unknown to the crane operator so that an unbalance situation too severe to be corrected can arise before the operator can take action to retrieve the situation. The bearing is actually the weakest part of the crane structure and during the situations described above the twisting on the bearing can be such as to cause the movable portion of the bearing supporting the jib and all the rest of the structure of the crane apart from the mast to twist off the mast so that the crane structure apart from the mast topples even falling overboard from a ship or an oil rig. There have already been several fatal accidents because of the occurrence of these conditions.

To overcome this disability derrick cranes have heretofore been constructed with the jib mounted on a long sleeve rotatable around the mast on two sets of spaced roller bearings, one set being arranged to resist axial thrust and the other set being arranged to resist radial thrust.

This construction is complicated, expensive and clumsy since it requires either that the sleeve should extend below upper deck level, in which construction the most convenient method of slewing is by means of a cable wound around the sleeve and connected to a winch, although here there is a limitation imposed on the available angle of slew and this construction requires a large hole to be cut in the upper deck for passage of the rotatable sleeve, or that the sleeve should extend upwardly above upper deck level adding to the deadweight trying to capsize the ship. Also two sets of spaced roller bearings often give rise to trouble because of problems of alignment resulting from wear and temporary distortion of the structure particularly when the derrick is lifting heavy loads and starting and stopping heavy loads.

SUMMARY OF THE INVENTION

It is an object of the present invention to provide a derrick crane which is free from difficulties caused by distortion and wear, is cheap to construct and can be fitted as a unit to a ship's hull without interference with the ship's structure, which is lighter than known derricks of the same lifting capacity and adds the minimum of capsizing weight to a ship or other floating structure.

A derrick crane according to the invention having a jib pivotally connected by way of a horizontal pivot to the movable member of a bearing device supported by a pedestal, luffing gear arranged to raise and lower the jib about the horizontal pivot, hoisting gear arranged to raise and lower a load suspended from the jib and slewing gear arranged to swing the jib around the pedestal, is characterized in that the pedestal is extended above the bearing device to form a mast and luffing cables of the luffing gear are connected between the top of the mast and the upper end of the jib, and the bearing device comprises a single ring of free-running balls which are a running fit in part-circular annular grooves in inner and outer bearing rings of which the inner bearing ring is connected to the mast, and the bearing device is so positioned vertically on the mast with respect to the pivot by which the jib is connected to the outer bearing ring that the line of thrust of the jib through said pivot passes within the pitch circle diameter of the ring of balls.

The slewing gear may comprise a slewing winch supported on the outer bearing ring and having a driving shaft carrying a pinion meshing with a toothed ring surrounding the mast and fixed with respect to the mast.

The toothed ring may be fixed to the mast.

The cylindrical surface of the inner bearing ring and of the outer bearing ring formed with the part-circular annular groove may be of different radii on opposite sides of the groove such that the surface of smaller radius on the inner ring is opposite the surface of smaller radius on the outer ring and the two surfaces of larger radius are opposite from one another so that the clearance gaps between the inner and outer rings on opposite sides of the ring of balls are offset from one another in a radial direction.

The inner bearing ring may be mounted on an annular bracket surrounding and forming an integral part of the upper portion at least of the mast structure although formed separately therefrom.

The annular bracket may be formed to the same inner and outer diameters as the mast so that it may be inserted and welded to adjacent coaxial mast sections to form the mast.

The bearing device may be formed in segments, for example in halves to permit easy assembling and dismantling.

The mast may be surrounded by a platform formed with an aperture through which the mast passes this platform being located above the bearing and being attached to the outer bearing ring, said platform carrying brackets which support the pivots by which the jib is attached to the platform and also the slewing winch.

The platform may conveniently be square in its outer contour and circular in its inner contour which surrounds the mast. The platform may be in halves.

A control cabin from which all the operations of the derrick crane are controlled may be supported on the platform preferably at a position to one side of and below the level of the pivots by which the jib is attached to the platform.

BRIEF DESCRIPTION OF THE DRAWINGS

A practical embodiment of the invention is illustrated in the accompanying drawings in which FIG. 3 is a section through the line 3—3 in FIG. 2.

DETAILED DESCRIPTION OF THE PREFERRED EMBODIMENT

Figure 1:
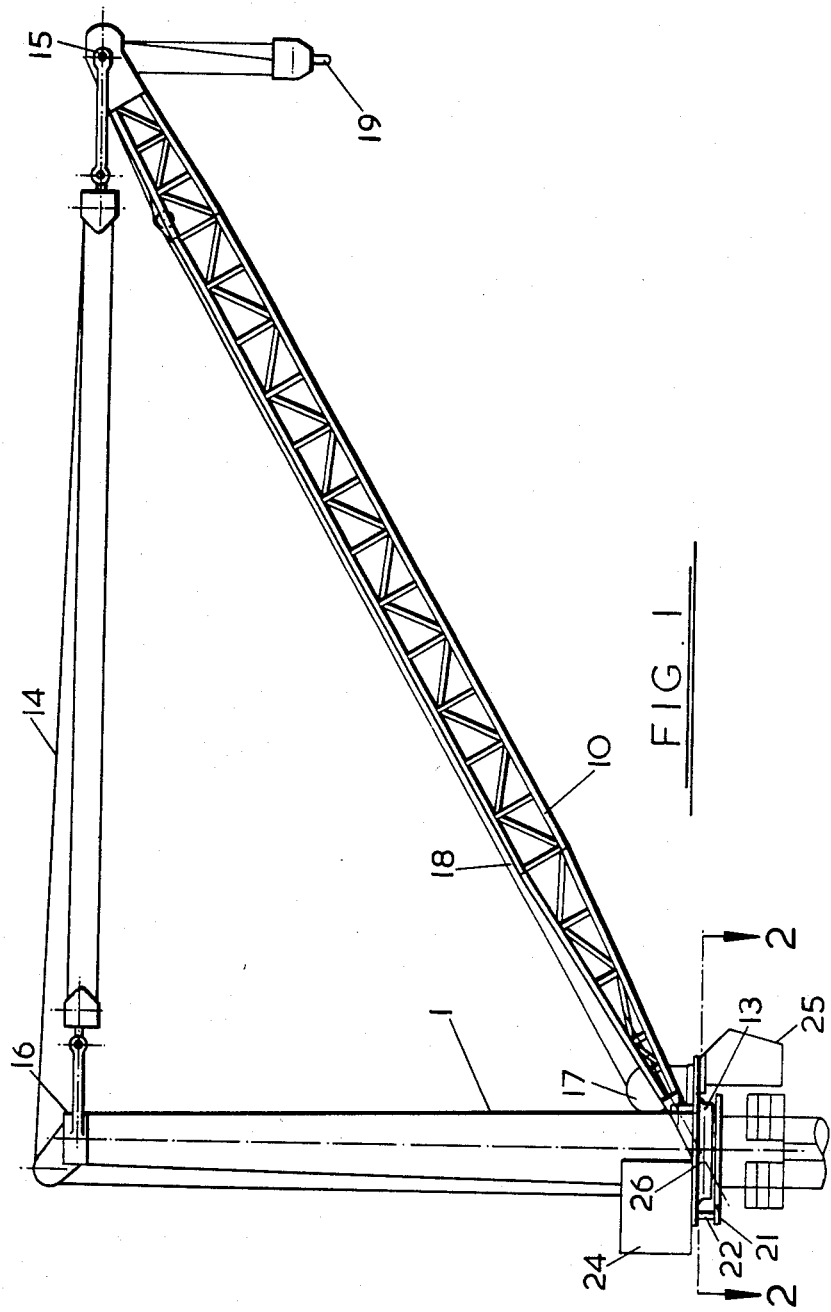
FIG. 1 is a side elevation of a derrick crane.
Figure 2:
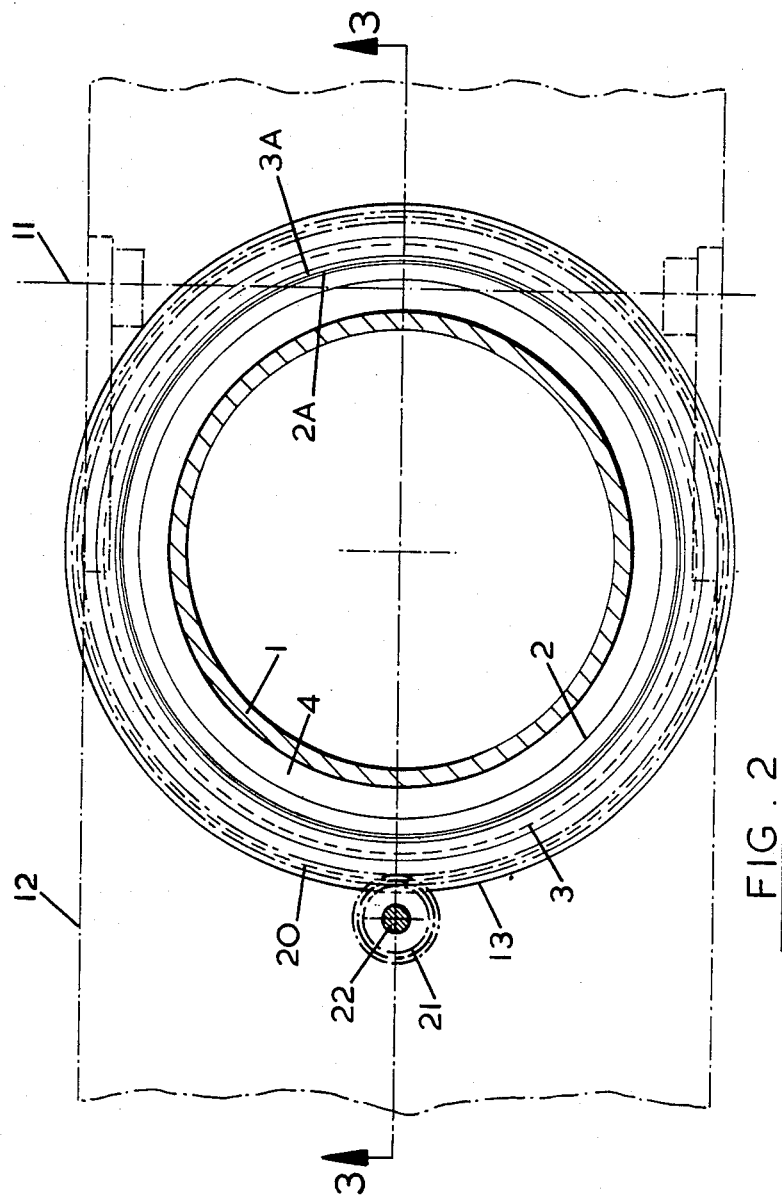
FIG. 2 is a section through the line 2—2 in FIG. 1

In the drawings 1 denotes a rigid stationary mast and 2 and 3 denote inner and outer bearing rings, the inner ring 2 being mounted on an annular bracket 4 integral with the mast 1. The rings 2 and 3 are formed with registering part-circular grooves 5 and 6 in which one set of free running balls 7 is able to circulate. The grooves together make an almost completely circular channel for the balls so that the bearing can support loads coming from any direction from axial to radial and, the bearing members being balls the bearing can still provide full bearing support. The resistance to axial loads on the bearing is enhanced by offsetting from one another the clearance gaps between the ring members 2 and 3 so that the proportion of compressive load on the balls is increased and the proportion of shear load is reduced. This is done be making the diameter of the cylindrical surface 2A on one side of the groove 5 in the ring 2 less than the diameter of the cylindrical surface 2B on the other side of the groove 5 and the diameter of the cylindrical surface 3A on one side of the groove 6 in the ring 3 less than the diameter of the cylindrical surface 3B on the other side of the groove 6. 10 denotes a jib one end of which is connected by a pivotal connection 11 to a platform 12 surrounding the mast 1 and connected to the outer bearing ring 3 by a bracket ring 13 so that in effect the jib 10 is pivoted to the bearing ring 3. 14 denotes a luffing mechanism connected at 15 to the other end of the jib 9 and to a pivotal connection 16 located at the top of the mast 1. 17 denotes a hoisting winch coupled by a cable 18 to a hoisting hook 19, the cable 18 passing over a guide pulley at the outer end of the jib 9. The hoisting winch 17 is also supported on the platform 12 and thus on the outer ring member 3. 20 denotes a toothed slew ring surrounding the mast 1 and attached to the annular bracket 4 the toothed slew ring 20 being in mesh with a driving pinion 21 mounted on the driving shaft 22 of a slewing winch 23 housed on an engine house 24 mounted on the platform 12. The engine house 24 also houses the drive for operating the luffing mechanism 14. 25 denotes a control cabin carried by the platform 12. 26 denotes the line of the thrust from the jib 10 and 27 denotes the pitch circle diameter of the balls 7.

In practice, all load tending to topple the crane as a result of snagging of the hook or trying to lift an excessive load is transmitted directly to the mast 1 partly by way of the luffing mechanism 14 and partly through the pivotal connection 11. Since the pivotal connection 11 is a pin joint any load transmitted through this pivot must be a direct load, that is no bending load can be transmitted. The thrust through the pivotal connection 11 must then be along the jib 10. This oblique load tends to load the bearing unevenly around its circumference and introduce some element of distortion. The balls however being supported over almost their whole surface are able to resist such oblique load from any direction, also because of the greater mobility of balls compared with rollers any distortion of the bearing rings has less adverse effect on the carrying ability of the balls and twisting loads are better borne. By making the diameter of the cylindrical surface 3A equal to the diameter of the cylindrical surface 2B the ball is subject to maximum shearing force only by a true axial load which seldom occurs and in any event would be taken by the maximum cross-sectional area of the ball. Thus most of the load on the balls is compressive and the possibility of failure of the balls is much reduced.

The structure of the invention is simple and cheap to construct and assemble and access for maintenance is easy, particularly if the rings 2 and 3 are made in sections such as halves.

The comparative flexibility of the ball bearing construction with a single ring of balls allows small distortions to be accommodated yet the combination of the rings with almost totally enclosed close fitting balls provides the effect of an almost solid ring providing great strength against overloads so that with the main force tending to topple the crane borne by the rigid and normally well-anchored mast toppling of the crane is virtually impossible.

The foregoing description will make it easy to understand the unique advantages provided by the construction of the invention especially when it is remembered that the swivel bearing of a derrick crane is the part operating under the severest conditions of loading and stress and is normally the most expensive individual item of the crane structure.

The advantages of the invention arise because of the following conditions.

The platform is never subjected to more than a small tilting moment. This is because the topping cables of the luffing gear are anchored to the top of the mast and the mast bears all the load tending to tilt the crane. Also, because the line of thrust of the jib always passes within the pitch circle of the balls there is no tendency or only a small tendency towards tilting of the ball bearing. Put another way the force system occurring at any chord of the pitch circle of the balls parallel to the plane containing the line of thrust of the jib and the axis of the mast is substantially the same as that occurring in a simply supported beam with the load applied downwards between end supports, the reaction at both end supports being upwards with the result that the beam shows little or no tendency to tilt. Each chord of the ring thus has little or no tendency to tilt and the whole ring shows little or no tendency to tilt.

The clearance necessarily provided between the balls and their bearing surfaces allows the balls some degree of radial movement. Since a ball which has the same radius as its bearing surface makes line contact with that surface it will be appreciated that where the clearance is small, only a small radial movement of the balls is required to cover a large arc of the bearing surface. Use is made of this phenomenon in the present invention.

In operation of any derrick crane the angle of the jib is constantly being altered. The line of thrust of the jib is thus constantly being altered. This thrust in the present construction is applied to the balls of the bearing in a direction which correspondingly varies. A ball cannot transmit any form of bending moment or torque. Thus the balls under varying directions of thrust move to new radial positions relatively to the bearing surface on the bearing rings to become aligned with the new direction of thrust. Because of the characteristics of small clearance described above, their movement along the arcs of the bearing surfaces are appreciable and thus wear is well distributed over the bearing surfaces with consequent extention of the life of the bearing. Ball thrust bearings of known type do not present this desirable feature. The known type of thrust bearing incorporates two cup-shaped overlapping bearing rings with large clearance between them and the balls except at the two diametrally opposite points on the balls where they are in contact with the bearing surface. Very little radial movement is available to the balls in such a construction without jamming of the balls and thus all wear is concentrated on a narrow line along the bearing surface.

These objections do not apply to constructions employing spaced, roller bearings constructed to support radial thrust and axial thrust only but as has been said above such constructions necessarily employing sleeves are heavy, expensive to construct and difficult and expensive to maintain and repair. The construction of the present invention is intended to provide all the good qualities of spaced roller bearings while being light, cheap to construct and very accessible for maintenance and repair. In fact when the bearing is constructed in segments it is easy practically to double the normal life of the bearing. When the bearing is loaded it will be readily understood that because of the direction of the thrust of the jib all or substantially all the load is borne by the lower half of the bearing surface of the outer bearing ring and the upper half of the inner bearing ring and it is on these halves that all or almost all wear occurs. When the amount of wear has become unacceptable the bearing can be virtually renewed by removing the bearing ring, an action which can be readily done by providing a temporary support for the jib, separating the bearing ring segments, then replacing the segments with the bearing now inverted, that is the tops of the rings are now at the bottom. It is now the formerly unworn or little worn halves of the bearing surfaces which bear the load. The balls may be easily replaced at the same time if this is considered desirable.

The foregoing operation is easily and speedily performed because the single bearing is readily accessible without dismantling any other part of the crane.

Reference to a possible small amount of wear on the normally unloaded parts of the bearing rings, i.e. the upper part of the bearing surface of the outer ring 3 and the lower part of the bearing surface of the inner ring 2 has been made because under certain exceptional conditions of loading for example an exceptional load at maximum radius, the mast may bend enough to distort the bearing sufficiently to bring the balls on the side of the bearing opposite the jib temporarily into contact with the normally unloaded parts of the bearing surfaces. Such conditions would normally be of short duration and should give rise to no or negligible wear.

What is claimed is:

1. A derrick crane of the type having
    a jib pivotally connected by way of a horizontal pivot to a movable member of a bearing device supported by a pedestal,
    luffing gear arranged to raise and lower the jib about the horizontal pivot, hoisting gear arranged to raise and lower a load suspended from the jib and slewing gear arranged to swing the jib around the pedestal,
    in which the pedestal is extended above the bearing device to form a mast and luffing cables of the luffing gear are connected between the top of the mast and the upper end of the jib,
    and the bearing device comprises inner and outer bearing rings formed with registering part-circular annular grooves, a single ring of free-running balls which are a running fit in said annular grooves in said inner and outer bearing rings of which the inner bearing ring is connected to the mast, and the bearing device is supporting said jib vertically and is so positioned vertically on the mast with respect to the horizontal pivot by which the jib is connected to the outer bearing ring that the line of thrust of the jib through said horizontal pivot passes within the pitch circle diameter of said ring of balls during normal use whereby the vertical and horizontal component forces of the force exerted by said jib produce moments about the bearing centerline moment axis which oppose one another.

2. A derrick crane as claimed in claim 1 in which the slewing gear comprises a slewing winch supported on the outer bearing ring and having a driving shaft, a pinion mounted on said driving shaft and a toothed ring surrounding the mast and fixed with respect to the mast, said pinion meshing with said toothed ring.

3. A derrick crane as claimed in claim 2 in which the toothed ring is fixed to the mast.

4. A derrick crane as claimed in claim 1 in which the cylindrical surface of the inner bearing ring and of the outer bearing ring formed with the part-circular annular groove are of different radii on opposite sides of the groove such that the surface of smaller radius on the inner ring is opposite the surface of smaller radius on the outer ring and the two surfaces of larger radius are opposite from one another so that the clearance gaps between the inner and outer rings on opposite sides of the ring of balls are offset from one another in a radial direction.

5. A derrick crane as claimed in claim 1 in which an annular bracket surrounds and forms an integral part of the upper portion at least of the mast structure although formed separately therefrom and the inner bearing ring is mounted on said annular bracket.

6. A derrick crane as claimed in claim 5 in which the annular bracket is formed to the same inner and outer diameters as the mast so that it may be inserted and welded to adjacent co-axial mast sections to form the mast.

7. A derrick crane as claimed in claim 1 in which the bearing device is formed in segments.

8. A derrick crane as claimed in claim 1 in which a platform formed with an aperture though which the mast passes is located above the bearing device and is attached to the outer bearing ring, brackets which support the pivots by which the jib is attached to the platform being mounted on the platform as is also the slewing gear.

* * * * *